United States Patent
Zhang et al.

(10) Patent No.: US 11,244,651 B2
(45) Date of Patent: Feb. 8, 2022

(54) COLOR GAMUT MATCHING METHOD, DEVICE, DISPLAY TERMINAL AND READABLE STORAGE MEDIUM

(71) Applicant: SHENZHEN TCL NEW TECHNOLOGY CO., LTD., Guangdong (CN)

(72) Inventors: Xiaodong Zhang, Guangdong (CN); Renli Xie, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/251,205

(22) PCT Filed: Oct. 21, 2019

(86) PCT No.: PCT/CN2019/112294
§ 371 (c)(1),
(2) Date: Dec. 11, 2020

(87) PCT Pub. No.: WO2020/083221
PCT Pub. Date: Apr. 30, 2020

(65) Prior Publication Data
US 2021/0264875 A1 Aug. 26, 2021

(30) Foreign Application Priority Data
Oct. 22, 2018 (CN) .......................... 201811232857.0

(51) Int. Cl.
*G09G 5/06* (2006.01)
*G06F 17/16* (2006.01)
*G09G 3/20* (2006.01)

(52) U.S. Cl.
CPC ............... *G09G 5/06* (2013.01); *G06F 17/16* (2013.01); *G09G 3/2003* (2013.01); *G09G 2320/0666* (2013.01)

(58) Field of Classification Search
CPC ............. G09G 5/06; G09G 3/2003; G09G 2320/0666; G09G 2320/0673; G06F 17/16
See application file for complete search history.

(56) References Cited

U.S. PATENT DOCUMENTS

2018/0300862 A1 * 10/2018 Keating .................. G06T 5/009

FOREIGN PATENT DOCUMENTS

| CN | 101790100 A | 7/2010 |
| CN | 102598114 A | 7/2012 |

(Continued)

OTHER PUBLICATIONS

First Office Action in counterpart Chinese Application No. 201811232857.0, dated Mar. 2, 2020.
(Continued)

*Primary Examiner* — Robert J Michaud
(74) *Attorney, Agent, or Firm* — Nathan & Associates; Menachem Nathan

(57) ABSTRACT

Disclosed is a color gamut matching method. The method includes: obtaining image data to be matched of a source terminal; establishing a preliminary matching relationship between the image data to be matched and image data to be output of a display terminal according to color gamut data coordinates of the source terminal and color gamut data coordinates of the display terminal; obtaining preliminary image data to be output of the display terminal according to the preliminary matching relationship; and accurately matching the preliminary image data to be output of the display terminal according to a 3D look-up table to obtain
(Continued)

accurate image data to be displayed of the display terminal. Further disclosed are a color gamut matching device, a display terminal and a readable storage medium. The present disclosure can solve the color distortion of the display color gamut and improve the display effect of the display.

17 Claims, 9 Drawing Sheets

(56) References Cited

FOREIGN PATENT DOCUMENTS

| CN | 106128373 A | | 11/2016 |
|---|---|---|---|
| CN | 106170102 A | | 11/2016 |
| CN | 107343187 A | | 11/2017 |
| CN | 107790100 A | * | 3/2018 |
| CN | 109286802 A | | 1/2019 |

OTHER PUBLICATIONS

The Second Office Action in counterpart Chinese Application No. 201811232857.0, dated Oct. 10, 2020.
International Search Report in corresponding PCT Application No. PCT/CN2019/112294, dated Feb. 5, 2020.
Written Opinion of the International Searching Authority in corresponding PCT Application No. PCT/CN2019/112294, dated Feb. 5, 2020.

* cited by examiner

COLOR GAMUT MATCHING METHOD, DEVICE, DISPLAY TERMINAL AND READABLE STORAGE MEDIUM

CROSS-REFERENCE TO RELATED APPLICATIONS

This application is the National Stage of International Application No. PCT/CN2019/112294, filed on Oct. 21, 2019, which claims priority to Chinese Application No. 201811232857.0, filed on Oct. 22, 2018, entitled "COLOR GAMUT MATCHING METHOD, DEVICE, DISPLAY TERMINAL AND READABLE STORAGE MEDIUM", the entire disclosure of which is incorporated herein by reference.

TECHNICAL FIELD

The present disclosure relates to the technical field of color gamut, in particular to a color gamut matching method, a color gamut matching device, a display terminal and a readable storage medium.

BACKGROUND

Color gamut refers to the range of color performance, which can be divided into display device color gamut and image color gamut. Different systems or devices have different color gamuts. Systems and device with a large color gamut can display more colors. Systems and devices with a small color gamut can display relatively few colors. The image colors of the same source terminal are displayed on different display devices, and the displayed colors are different.

The color transmission of the broadcast television system is mainly from the transmission color gamut to the display color gamut. The transmission color gamut is the image color space of the source terminal transmitted by the broadcast television system. The display color gamut is the color space that the display device can cover. The transmission color gamut of the broadcast television system has BT601, BT709 color gamut and so on. With the development of display terminal technology, the display color gamut is also expanding. The existing display color gamut is usually larger than the transmission color gamut. However, the display color gamut cannot completely include the transmission color gamut. There is intersection between the display color gamut and the transmission color gamut, causing color distortion and affecting the display effect of the display.

Regarding the above problems, the existing consumer-level broadcast television systems generally do not match the color gamut. If the matching process is performed, it is only a rough match from the transmission color gamut to the display color gamut through the conversion matrix. The result of this matching is not accurate, and the image color of the source terminal cannot be truly restored.

SUMMARY

The main objective of the present disclosure is to provide a color gamut matching method, a color gamut matching device, a display terminal and a readable storage medium, which aims to solve the color distortion of the display color gamut and improve the display effect of the display.

In order to achieve the above objective, the present disclosure provides a color gamut matching method, including the following operations:

obtaining image data to be matched of a source terminal;

establishing a preliminary matching relationship between the image data to be matched and image data to be output of a display terminal according to color gamut data coordinates of the source terminal and color gamut data coordinates of the display terminal;

obtaining preliminary image data to be output of the display terminal according to the preliminary matching relationship; and accurately matching the preliminary image data to be output of the display terminal according to a 3D look-up table to obtain accurate image data to be displayed of the display terminal.

In an embodiment, after the operation of accurately matching the preliminary image data to be output of the display terminal according to a 3D look-up table to obtain accurate image data to be displayed of the display terminal, the color gamut matching method further includes:

performing Gamma preset adjustment on the accurate image data to be displayed of the display terminal for display on the display terminal.

In an embodiment, the operation of obtaining image data to be matched of a source terminal includes:

obtaining the image data of the source terminal;

normalizing the image data according to maximum value to obtain normalized image data; and linearizing the normalized image data to obtain the image data to be matched.

In an embodiment, the image data are non-linear R, G and B image signal pixel values, the non-linear R, G and B image signal pixel values range from 0 to $(2^n-1)$, n is number of bits, and the image data to be matched are R, G and B image signal pixel values processed by normalization and linearization.

In an embodiment, the color gamut data coordinates of the source terminal include color coordinates of R, G and B vertices and coordinates of white points of the source terminal, and the color gamut data of the display terminal include color coordinates of R, G and B vertices and coordinates of white points of the display terminal.

In an embodiment, the operation of establishing a preliminary matching relationship between the image data to be matched and image data to be output of a display terminal according to color gamut data coordinates of the source terminal and color gamut data coordinates of the display terminal includes:

matching and converting the image data to be matched through a matrix $A_S$ to obtain X, Y and Z tristimulus values, a matching relationship between the matrix $A_S$, image data $R_S$, $G_S$ and $B_S$ to be matched and the X, Y and Z tristimulus values is as follows:

$$\begin{pmatrix} X \\ Y \\ Z \end{pmatrix} = A_s * \begin{pmatrix} R_s \\ G_s \\ B_s \end{pmatrix} \quad (1)$$

elements in the matrix $A_S$ are determined by the color coordinates of R, G and B vertices and the coordinates of white points of the source terminal;

matching and converting the X, Y and Z tristimulus values through a matrix $A_d$ to obtain the image data to be output of the display terminal, a matching relationship between the matrix $A_d$, the X, Y and Z tristimulus values and image data $R_d$, $G_d$ and $B_d$ to be output of the display terminal is as follows:

$$\begin{pmatrix} R_d \\ G_d \\ B_d \end{pmatrix} = A_d * \begin{pmatrix} X \\ Y \\ Z \end{pmatrix} \quad (2)$$

elements in the matrix $A_d$ are determined by the color coordinates of R, G and B vertices and the coordinates of white points of the display terminal;

preliminarily matching the image data to be matched through a matrix A to obtain the image data to be output of the display terminal, a matching relationship between the matrix A, image data $R_s$, $G_s$ and $B_s$ to be matched and image data $R_d$, $G_d$ and $B_d$ to be output of the display terminal is as follows:

$$\begin{pmatrix} R_d \\ G_d \\ B_d \end{pmatrix} = A * \begin{pmatrix} R_s \\ G_s \\ B_s \end{pmatrix} \quad (3)$$

elements in the matrix A are determined by the matrix $A_S$ and the matrix $A_d$, and a conversion relationship between the elements in the matrix A and the matrix $A_S$ and the matrix $A_d$ is as follows:

$$A = A_S * A_d \quad (4).$$

Besides, in order to achieve the above objective, the present disclosure further provides a color gamut matching device, including:

an obtaining module for obtaining image data to be matched of a source terminal;

a preliminary matching relationship establishment module for establishing a preliminary matching relationship between the image data to be matched and image data to be output of a display terminal according to color gamut data coordinates of the source terminal and color gamut data coordinates of the display terminal;

a preliminary matching module for obtaining preliminary image data to be output of the display terminal according to the preliminary matching relationship; and an exact matching module for accurately matching the preliminary image data to be output of the display terminal according to a 3D look-up table to obtain accurate image data to be displayed of the display terminal.

In an embodiment, the obtaining module includes:

a data unit for obtaining the image data of the source terminal;

a normalization unit for normalizing the image data according to maximum value to obtain normalized image data; and a linearization unit for linearizing the normalized image data to obtain the image data to be matched.

Besides, in order to achieve the above objective, the present disclosure further provides a display terminal, including a display, a memory, a processor, and a color gamut matching program stored on the memory and executable on the processor, the color gamut matching program, when executed by the processor, implements the operations of the color gamut matching method described above.

Besides, in order to achieve the above objective, the present disclosure further provides a readable storage medium, a color gamut matching program is stored on the readable storage medium, and the color gamut matching program, when executed by a processor, implements the operations of the color gamut matching method described above.

The present disclosure obtains image data to be matched of a source terminal; establishes a preliminary matching relationship between the image data to be matched and image data to be output of a display terminal according to R, G and B coordinates of the source terminal and R, G and B coordinates of the display terminal; obtains preliminary image data to be output of the display terminal according to the preliminary matching relationship; and accurately matches the preliminary image data to be output of the display terminal according to a 3D look-up table to obtain accurate image data to be displayed of the display terminal. Through the above method, in the present disclosure, after matching the image data of the source terminal, the image data is included in a large display color gamut, so that the color difference before and after matching is kept to a minimum, the color display of the source terminal is restored, the color distortion of the display terminal is reduced, and the display effect of the display is improved.

The realization of the objective, functional characteristics, advantages of the present disclosure are further described with reference to the accompanying drawings.

DETAILED DESCRIPTION OF THE EMBODIMENTS

It should be understood that the specific embodiments described herein are only used to explain the present disclosure and are not intended to limit the present disclosure.

The main solution of the embodiment of the present disclosure is:

the existing display color gamut is usually larger than the transmission color gamut, causing color distortion and affecting the display effect of the display. Alternatively, only rough matching from the transmission color gamut to the display color gamut through the conversion matrix cannot truly restore the colors of the source terminal.

The present disclosure obtains image data to be matched of a source terminal; establishes a preliminary matching relationship between the image data to be matched and image data to be output of a display terminal according to R, G and B coordinates of the source terminal and R, G and B coordinates of the display terminal; obtains preliminary image data to be output of the display terminal according to the preliminary matching relationship; and accurately matches the preliminary image data to be output of the display terminal according to a 3D look-up table to obtain accurate image data to be displayed of the display terminal. The preliminary matching image signal pixel initial data to be output is accurately matched according to the 3D look-up table, such that after the image data of the source terminal is further accurately matched, the image data is included in a large display color gamut, which restores the color display of the source terminal, reduces color distortion of the display terminal, and improves the display effect of the display.

Figure 1:
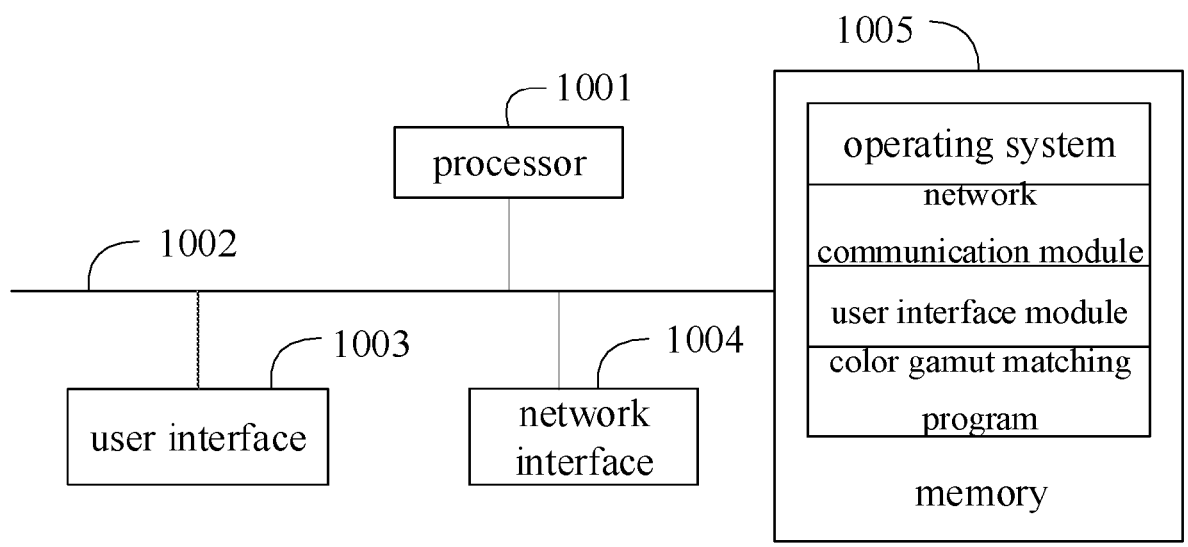
FIG. 1 is a schematic structural diagram of a terminal in a hardware operating environment according to an embodiment of the present disclosure.

As shown in FIG. 1, FIG. 1 is a schematic structural diagram of a terminal in a hardware operating environment according to an embodiment of the present disclosure.

In some embodiments of the present disclosure, the terminal may be a mobile terminal device with a display function, such as a smart phone, a tablet computer, an MP3 (Moving Picture Experts Group Audio Layer III) player, an MP4 (Moving Picture Experts Group Audio Layer IV) player, and a portable computer.

As shown in FIG. 1, the terminal may include a processor 1001, such as a CPU, a network interface 1004, a user interface 1003, a memory 1005, and a communication bus 1002. The communication bus 1002 is configured to implement connection and communication between these components. The user interface 1003 may include a display, an input unit such as a keyboard. The user interface 1003 may optionally include a standard wired interface and a wireless interface. The network interface 1004 may optionally include a standard wired interface and a wireless interface (such as a WI-FI interface). The memory 1005 may be a high-speed random access memory (RAM) memory or a non-volatile memory, such as a magnetic disk memory. The memory 1005 may optionally be a storage device independent of the foregoing processor 1001.

In an embodiment, the terminal may also include a camera, a Radio Frequency (RF) circuit, a sensor, an audio circuit, a WiFi module, and so on. The sensors may be, for example, a light sensor, a motion sensor, and other sensors. Specifically, the light sensor may include an ambient light sensor and a proximity sensor. The ambient light sensor may adjust the brightness of the display according to the brightness of the ambient light. The proximity sensor may turn off the display and/or the backlight when the mobile terminal is moved to the ear. A gravity acceleration sensor, as a kind of motion sensor, may detect the magnitude of acceleration in various directions (usually three axes). The gravity acceleration sensor may detect the magnitude and direction of gravity when it is stationary, and may be configured to identify the gesture of the mobile terminal (such as horizontal and vertical screen switching, related games, magnetometer attitude calibration), vibration recognition related functions (such as pedometer, tap), etc. Of course, the mobile terminal may also be configured with other sensors such as a gyroscope, a barometer, a hygrometer, a thermometer, an infrared sensor, and the like, which will not be repeated here.

Those skilled in the art should understand that the terminal structure shown in FIG. 1 does not constitute a limitation on the terminal, and may include more or fewer components than shown in the figure, or a combination of some components, or a different arrangement of components.

As shown in FIG. 1, the memory 1005 as a computer storage medium may include an operating system, a network communication module, a user interface module, and a color gamut matching program.

In the terminal shown in FIG. 1, the network interface 1004 is mainly configured to connect to a background server and perform data communication with the background server. The user interface 1003 is mainly configured to connect to a client (user) and perform data communication with the client. The processor 1001 may be configured to call the color gamut matching program stored on the memory 1005, and perform the following operations:

obtaining image data to be matched of a source terminal;

establishing a preliminary matching relationship between the image data to be matched and image data to be output of a display terminal according to color gamut data coordinates of the source terminal and color gamut data coordinates of the display terminal;

obtaining preliminary image data to be output of the display terminal according to the preliminary matching relationship; and accurately matching the preliminary image data to be output of the display terminal according to a 3D look-up table to obtain accurate image data to be displayed of the display terminal.

Further, after the operation of accurately matching the preliminary image data to be output of the display terminal according to a 3D look-up table to obtain accurate image data to be displayed of the display terminal, further including:

performing Gamma preset adjustment on the accurate image data to be displayed of the display terminal for display on the display terminal.

Further, the operation of obtaining image data to be matched of a source terminal includes:

obtaining the image data of the source terminal;

normalizing the image data according to maximum value to obtain normalized image data; and linearizing the normalized image data to obtain the image data to be matched.

Further, the image data are non-linear R, G and B image signal pixel values, the non-linear R, G and B image signal pixel values range from 0 to ($2^n$−1), n is number of bits, and the image data to be matched are R, G and B image signal pixel values processed by normalization and linearization.

Further, the color gamut data coordinates of the source terminal include color coordinates of R, G and B vertices and coordinates of white points of the source terminal, and the color gamut data of the display terminal include color coordinates of R, G and B vertices and coordinates of white points of the display terminal.

Further, the operation of establishing a preliminary matching relationship between the image data to be matched and image data to be output of a display terminal according to color gamut data coordinates of the source terminal and color gamut data coordinates of the display terminal includes:

matching and converting the image data to be matched through a matrix $A_S$ to obtain X, Y and Z tristimulus values, a matching relationship between the matrix $A_S$, image data $R_S$, $G_S$ and $B_S$ to be matched and the X, Y and Z tristimulus values is as follows:

$$\begin{pmatrix} X \\ Y \\ Z \end{pmatrix} = A_s * \begin{pmatrix} R_s \\ G_s \\ B_s \end{pmatrix} \quad (1)$$

elements in the matrix $A_S$ are determined by the color coordinates of R, G and B vertices and coordinates of white points of the source terminal;

matching and converting the X, Y and Z tristimulus values through a matrix $A_d$ to obtain the image data to be output of the display terminal, a matching relationship between the matrix $A_d$, the X, Y and Z tristimulus values and image data $R_d$, $G_d$ and $B_d$ to be output of the display terminal is as follows:

$$\begin{pmatrix} R_d \\ G_d \\ B_d \end{pmatrix} = A_d * \begin{pmatrix} X \\ Y \\ Z \end{pmatrix} \quad (2)$$

elements in the matrix $A_d$ are determined by the color coordinates of R, G and B vertices and the coordinates of white points of the display terminal;

preliminarily matching the image data to be matched through a matrix A to obtain the image data to be output of the display terminal, a matching relationship between the matrix A, image data $R_s$, $G_s$ and $B_s$ to be matched and image data $R_d$, $G_d$ and $B_d$ to be output of the display terminal is as follows:

$$\begin{pmatrix} R_d \\ G_d \\ B_d \end{pmatrix} = A * \begin{pmatrix} R_s \\ G_s \\ B_s \end{pmatrix} \quad (3)$$

the elements in the matrix A are determined by the matrix $A_S$ and the matrix $A_d$, and a conversion relationship between the elements in the matrix A and the matrix $A_S$ and the matrix $A_d$ is as follows:

$$A = A_S * A_d \quad (4).$$

Based on the foregoing hardware structure, the method embodiments of the present disclosure are proposed.

Figure 2:
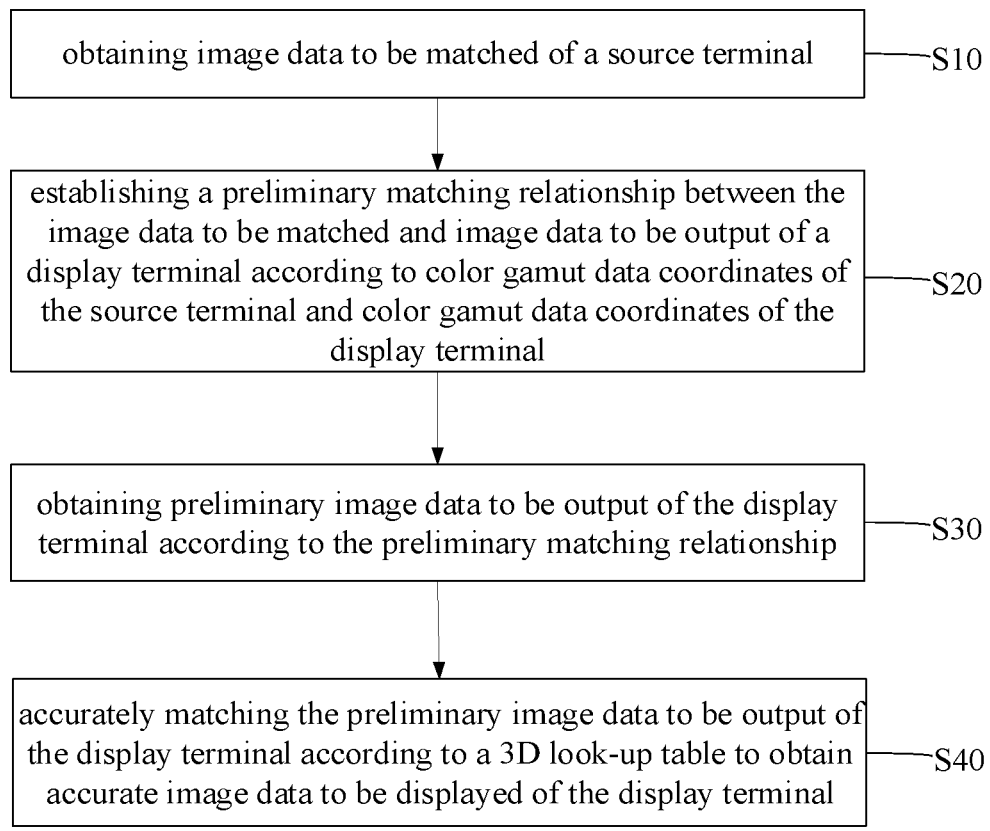
FIG. 2 is a schematic flowchart of a color gamut matching method according to a first embodiment of the present disclosure.

As shown in FIG. 2, FIG. 2 is a schematic flowchart of a color gamut matching method according to a first embodiment of the present disclosure, the method includes:

Operation S10, obtaining image data to be matched of a source terminal.

Color gamut is a method of encoding colors, and also refers to the total number of colors that a technical system can produce, that is, the range of the area formed by the number of colors that a certain color model can express. The image data to be matched of the source terminal is obtained by processing the image data of the source terminal, and the image data of the source terminal is the color gamut pixel value. It is understandable that the image data to be matched of the source terminal, the preliminary image data to be output of the display terminal, and the precise image data to be displayed of the display terminal are also color gamut pixel values.

Operation S20, establishing a preliminary matching relationship between the image data to be matched and image data to be output of a display terminal according to color gamut data coordinates of the source terminal and color gamut data coordinates of the display terminal.

The color gamut data coordinates are vertex coordinates and coordinates of white points. According to the vertex coordinates and coordinates of white points of the source terminal, and the vertex coordinates and coordinates of white points of the display terminal, the preliminary matching relationship of the matrix conversion between the image data to be matched and the image data to be output of the display terminal is established.

The elements in the matrix $A_S$ are determined by the vertex coordinates and coordinates of white points of the source terminal, and the elements in the matrix $A_d$ are determined by the vertex coordinates and coordinates of white points of the display terminal. The image data to be matched is input, and is converted into X, Y and Z tristimulus values through the matrix $A_s$. The X, Y and Z tristimulus values are converted into the image data to be output through the matrix $A_d$. Then, the conversion matrix A between the image data to be matched and the image data to be output of the display terminal is $A = A_S * A_d$, that is, the image data to be matched*A=the image data to be output of the display terminal.

Operation S30, obtaining preliminary image data to be output of the display terminal according to the preliminary matching relationship.

Through the established preliminary matching relationship, the input image data to be matched is converted into preliminary image data to be output through matrix A. When realizing the color gamut conversion in the preliminary matching matrix, only the color coordinates of the three vertices (255, 0, 0), (0, 255, 0) and (0, 0, 255) of the display were considered, and a rough matching was made. It is necessary to further accurately match the preliminary image data to be output obtained in the matrix conversion.

Operation S40, accurately matching the preliminary image data to be output of the display terminal according to a 3D look-up table to obtain accurate image data to be displayed of the display terminal.

3D look-up table is a technical means of color calibration, and is the calibration of the transmission color gamut to the display color gamut. 3D look-up table has better results. Since the 3D lookup table has R, G and B channels for each coordinate direction, the biggest advantage of the 3D lookup table in the color calibration field can affect the color gamut, color temperature and gamma at the same time, and is more accurate than the traditional matrix calibration method. In addition, the 3D lookup table can match and process all color information whether they are present or not, or those color gamuts that even film can't reach.

The working principle of the 3D lookup table is as follows. Assuming that $R_d$, $G_d$ and $B_d$ data are input, $R_d$, $G_d$ and $B_d$ becomes $R_p$, $G_p$ and $B_p$ which are still RGB datas after transformed by the 3D lookup table. The values of $R_p$, $G_p$ and $B_p$ are slightly different from the input data. The effects of $R_p$, $G_p$ and $B_p$ after transformation on the display terminal are the most correct. This is the function of the 3D lookup table, which is equivalent to calibrating the deviation of the display terminal.

In the 3D look-up table, an image data of the input source terminal corresponds to the image data to be displayed of a display terminal of a display color gamut. Different from preliminary matching, the X, Y and Z tristimulus values of the image data of the input source terminal are equal or matched with the X, Y and Z tristimulus values of the image data to be displayed of the output display terminal. The preliminary image data to be output of the input display terminal can be output through the 3D look-up table to output the precise image data to be displayed of the display terminal, so that the transmission color gamut to the display color gamut is transmitted without distortion, and the color display of the source terminal is restored.

Figure 3:
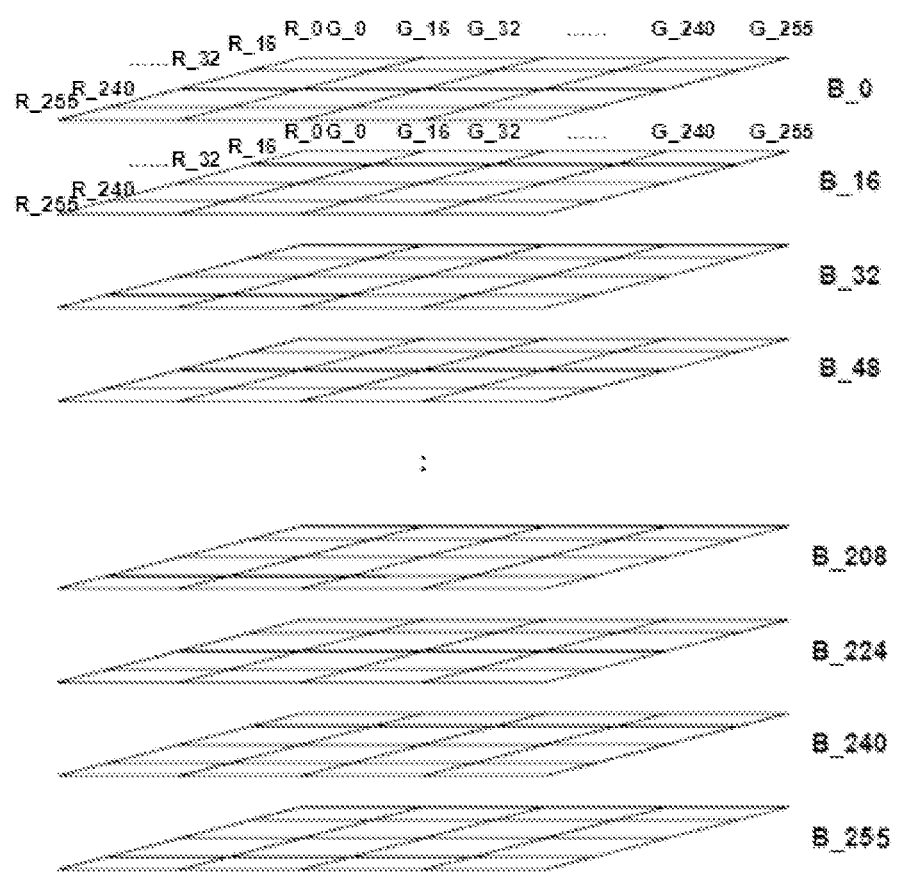
FIG. 3 shows the structure of a 17×17×17 3D lookup table.

Taking the 3D lookup table of 17×17×17 as an example, the structure of the 3D lookup table of 17×17×17 is shown in FIG. 3. Take 17 sampling points for R, G and B respectively, so that after permutation and combination of R, G and B, there will be 17×17×17=4913 sets of data. The acquisition of 4913 sets of data can be done by offline measurement.

The points that are not sampled are filled in by linear interpolation. Assuming that there are 8 bits, there are 256×256×256=16777216 sets of data.

The 3D look-up table samples and measures 17×17×17=4913 sets of data, and the 17×17×17=4913 sets of data are linearly interpolated to obtain all 256×256×256=16777216 sets of data, which is more accurate than the matrix that only considers the vertex coordinates.

Figure 4:
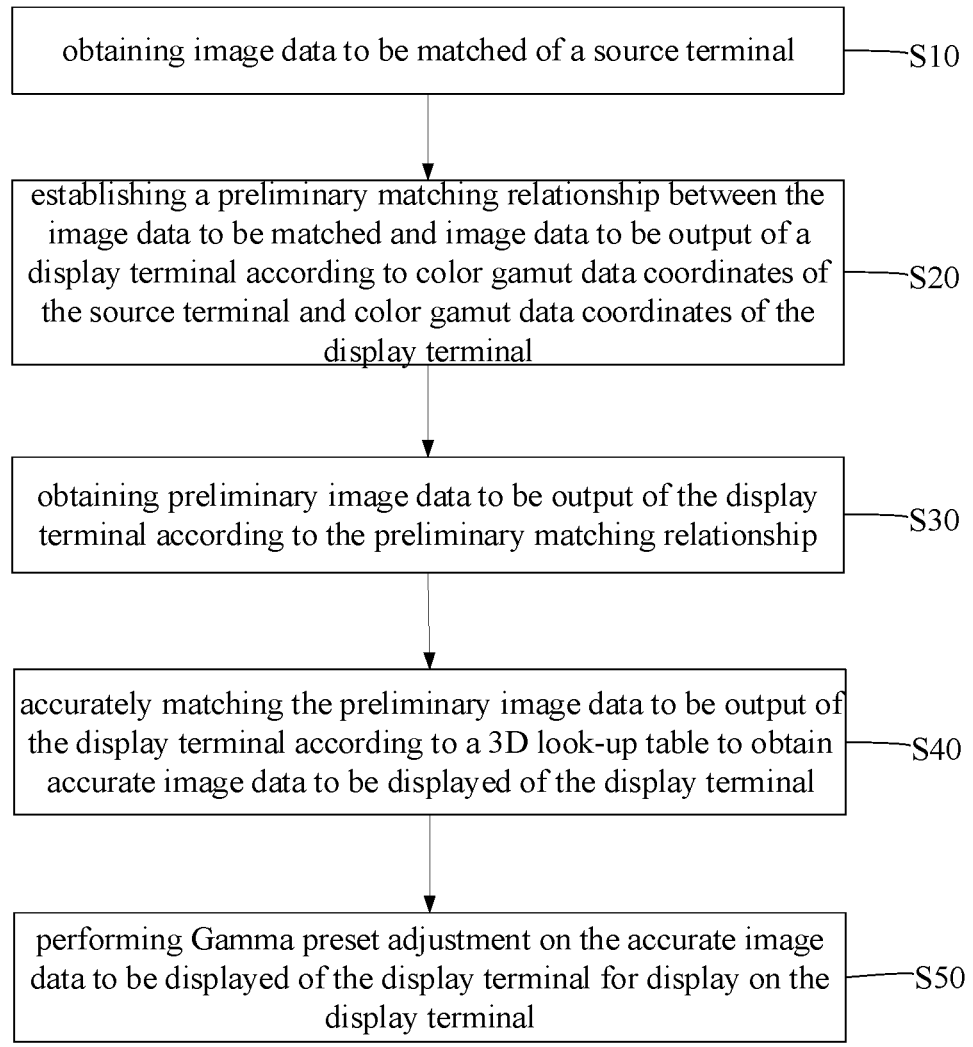
FIG. 4 is a schematic flowchart of the color gamut matching method according to a second embodiment of the present disclosure.

Further, as shown in FIG. 4, FIG. 4 is a schematic flowchart of the color gamut matching method according to a second embodiment of the present disclosure. Based on the embodiment shown in FIG. 2, after operation S40, the method further includes:

Operation S50, performing Gamma preset adjustment on the accurate image data to be displayed of the display terminal for display on the display terminal.

In order to match the gamma characteristics of the display terminal, the accurate image data to be displayed of the display terminal after matching with the 3D look-up table needs to be gamma preset to offset the influence of the gamma characteristic of the display terminal on the image. The accurate image data to be displayed of the display terminal through the gamma preset adjustment can be output for display on the display terminal.

Figure 5:
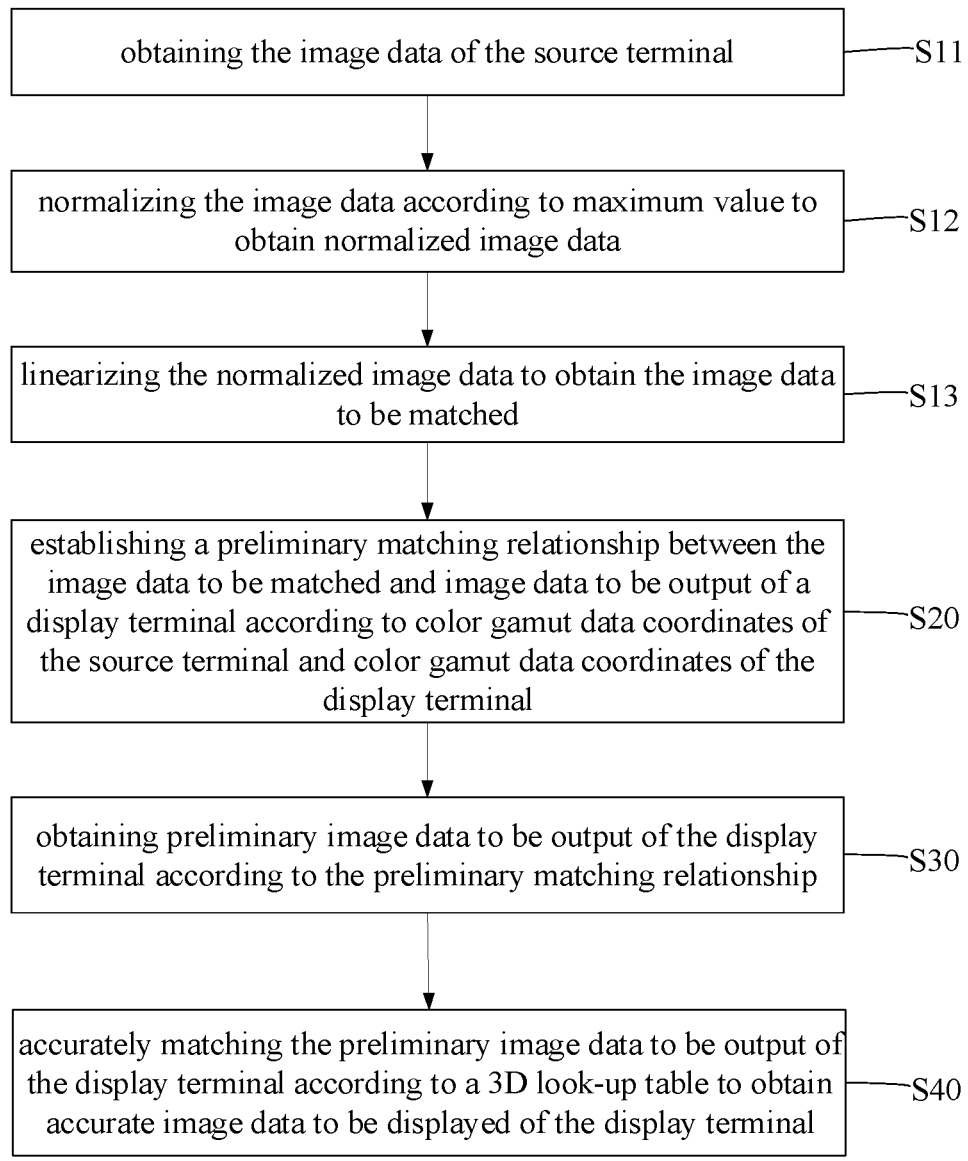
FIG. 5 is a schematic flowchart of the color gamut matching method according to a third embodiment of the present disclosure.

Further, as shown in FIG. 5, FIG. 5 is a schematic flowchart of the color gamut matching method according to a third embodiment of the present disclosure. Based on the above embodiments, operation S10 includes:

Operation S11, obtaining the image data of the source terminal; the image data of the source terminal is the color gamut pixel value.

Operation S12, normalizing the image data according to maximum value to obtain normalized image data.

The image data of the source terminal is normalized, the value range of the normalized image data is from 0 to 1. That is:

$R_L = R/(2^n - 1)$ $G_L = G/(2^n - 1)$ $B_L = B/(2^n - 1)$

The normalization process facilitates the linear processing of the image data in the next operation.

Operation S13, linearizing the normalized image data to obtain the image data to be matched.

The normalized image data is linearized, that is, the nonlinear image data is linearized to obtain linear image data to be matched. SDR/HDR data are linearized according to BT709/SMTPE ST2084 respectively, and are converted into linear image data to be matched to meet the data requirements of preliminary matching and exact matching of the color gamut.

Further, the image data are non-linear R, G and B image signal pixel values, the non-linear R, G and B image signal pixel values range from 0 to $(2^n-1)$, n is number of bits, and the image data to be matched are R, G and B image signal pixel values processed by normalization and linearization.

Color gamut is a method for encoding colors. Common color modes include RGB, CMKY, Lab. The image data is the non-linear R, G and B image signal pixel values of the source terminal.

Further, the color gamut data coordinates of the source terminal include color coordinates of R, G and B vertices and coordinates of white points of the source terminal, and the color gamut data of the display terminal include color coordinates of R, G and B vertices and coordinates of white points of the display terminal.

The image data $R_s$, $G_s$ and $B_s$ to be matched on the input source terminal are converted into X, Y and Z tristimulus values through matrix $A_S$. Then, the X, Y and Z tristimulus values are converted into the image data $R_d$, $G_d$ and $B_d$ to be output of the display terminal through the matrix $A_d$. The essence is to use X, Y and Z as media to realize the conversion of the X, Y and Z tristimulus values from the input source pixel data $R_s$, $G_s$ and $B_s$ to the display pixel initial data $R_d$, $G_d$ and $B_d$, etc.

The matrix $A_S$ is determined by the color coordinates of R, G and B vertices and the coordinates of white points of the source terminal; and the matrix $A_d$ is determined by the color coordinates of R, G and B vertices and the coordinates of white points of the display terminal.

For example, the color coordinates of the R, G and B vertices (x, y) of the BT709 source terminal are (0.640, 0.330), (0.300, 0.600), (0.150, 0.060), and the coordinates of white points (x, y) is (0.3127, 0.3290). Then, the matrix $A_S$ is:

$$A_S = \begin{pmatrix} 0.4124 & 0.3576 & 0.1805 \\ 0.2126 & 0.7152 & 0.0722 \\ 0.0193 & 0.1192 & 0.9505 \end{pmatrix}$$

The matrix $A_d$ is determined by the color coordinates of R, G and B vertices and the coordinates of white points of the display terminal.

$$A_d = \begin{pmatrix} b10 & b11 & b12 \\ b20 & b21 & b22 \\ b30 & b31 & b32 \end{pmatrix}$$

Figure 6:
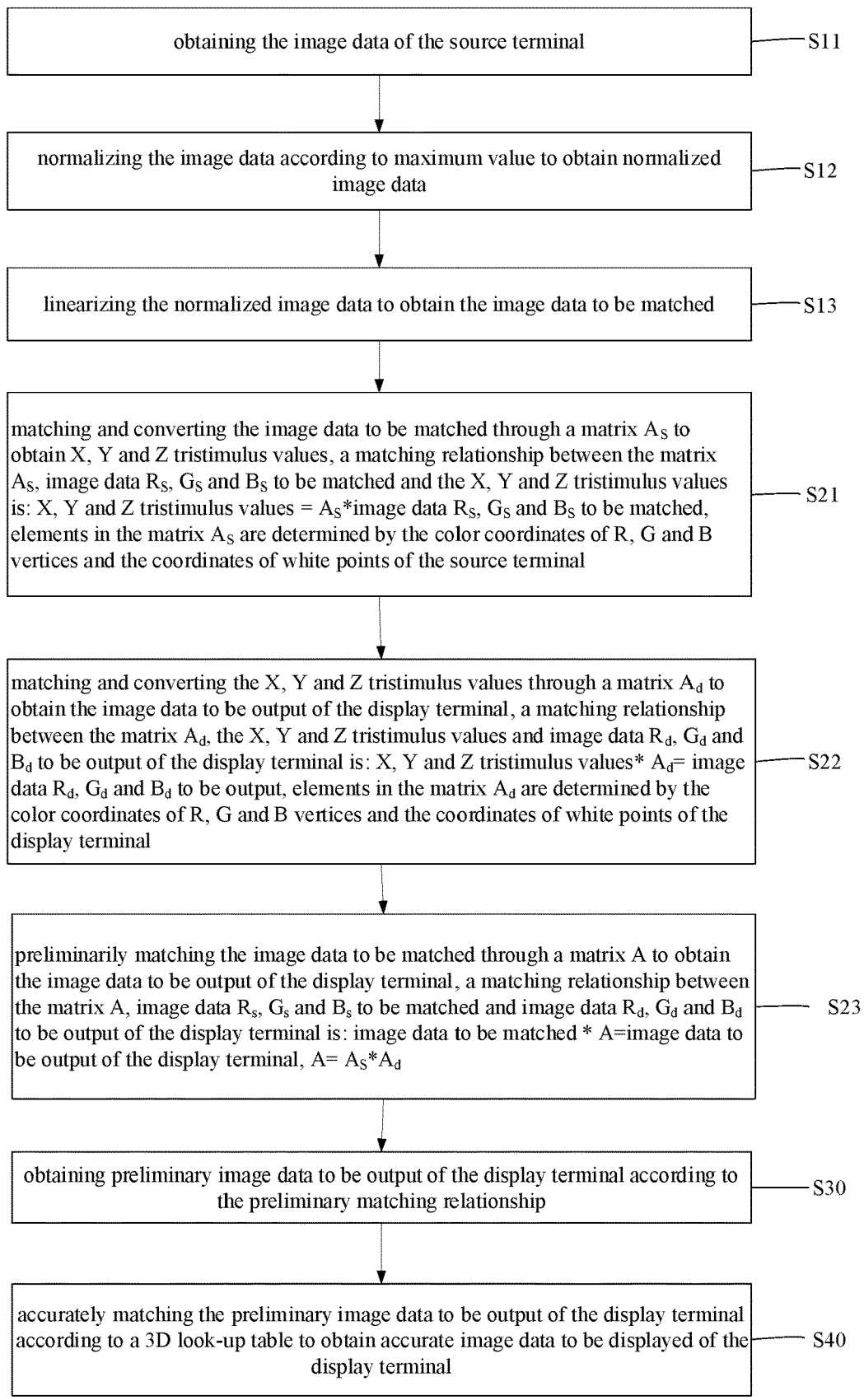
FIG. 6 is a schematic flowchart of the color gamut matching method according to a fourth embodiment of the present disclosure.

Further, as shown in FIG. 6, FIG. 5 is a schematic flowchart of the color gamut matching method according to a fourth embodiment of the present disclosure. Based on the above embodiments, operation S20 includes:

Operation S21, matching and converting the image data to be matched through a matrix $A_S$ to obtain X, Y and Z tristimulus values, a matching relationship between the matrix $A_S$, image data $R_S$, $G_S$, $B_S$ to be matched and the X, Y and Z tristimulus values is as follows:

$$\begin{pmatrix} X \\ Y \\ Z \end{pmatrix} = A_S * \begin{pmatrix} R_s \\ G_s \\ B_s \end{pmatrix} \quad (1)$$

elements in the matrix $A_S$ are determined by the color coordinates of R, G and B vertices and the coordinates of white points of the source terminal;

Operation S22, matching and converting the X, Y and Z tristimulus values through a matrix $A_d$ to obtain the image data to be output of the display terminal, a matching relationship between the matrix $A_d$, the X, Y and Z tristimulus values and image data $R_d$, $G_d$ and $B_d$ to be output of the display terminal is as follows:

$$\begin{pmatrix} R_d \\ G_d \\ B_d \end{pmatrix} = A_d * \begin{pmatrix} X \\ Y \\ Z \end{pmatrix} \quad (2)$$

elements in the matrix $A_d$ are determined by the color coordinates of R, G and B vertices and the coordinates of white points of the display terminal;

Operation S23, preliminarily matching the image data to be matched through a matrix A to obtain the image data to be output of the display terminal, a matching relationship between the matrix A, image data $R_s$, $G_s$ and $B_s$ to be matched and image data $R_d$, $G_d$ and $B_d$ to be output of the display terminal is as follows:

$$\begin{pmatrix} R_d \\ G_d \\ B_d \end{pmatrix} = A * \begin{pmatrix} R_s \\ G_s \\ B_s \end{pmatrix} \quad (3)$$

elements in the matrix A are determined by the matrix $A_S$ and the matrix $A_d$, and a conversion relationship between the elements in the matrix A and the matrix $A_S$ and the matrix $A_d$ is as follows:

$$A = A_S * A_d \quad (4).$$

The color gamut data coordinates include the color coordinates of R, G and B vertices and coordinates of white points. The image data $R_s$, $G_s$ and $B_s$ to be matched on the input source terminal are converted into X, Y and Z tristimulus values through matrix $A_S$. Then, the X, Y and Z tristimulus values are converted into the image data $R_d$, $G_d$ and $B_d$ to be output of the display terminal through the matrix $A_d$. The essence is to use X, Y and Z as media to realize the conversion of the X, Y and Z tristimulus values from the input source pixel data $R_s$, $G_s$ and $B_s$ to the display pixel initial data $R_d$, $G_d$ and $B_d$, etc. The image data to be matched is converted into the image data to be output of the display terminal through preliminary matching of the matrix A, then $A = A_S * A_d$, and the matching relationship is as in formula (4).

Figure 7:
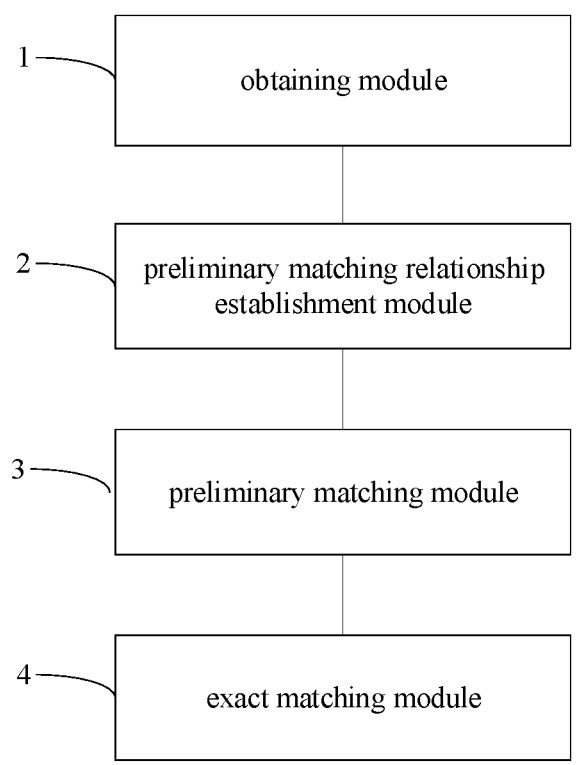
FIG. 7 is a schematic diagram of a color gamut matching device according to a first embodiment of the present disclosure.

The present disclosure further provides a color gamut matching device. As shown in FIG. 7, FIG. 7 is a schematic diagram of a color gamut matching device according to a first embodiment of the present disclosure.

The color gamut matching device of the present disclosure includes:

an obtaining module 1 for obtaining image data to be matched of a source terminal.

The obtaining module 1 obtains the image data to be matched of the source terminal. The image data to be matched of the source terminal is obtained by processing the image data of the source terminal, and the image data of the source terminal is the color gamut pixel value. It is understandable that the image data to be matched of the source terminal, the preliminary image data to be output of the display terminal, and the precise image data to be displayed of the display terminal are also color gamut pixel values.

a preliminary matching relationship establishment module 2 for establishing a preliminary matching relationship between the image data to be matched and image data to be output of a display terminal according to color gamut data coordinates of the source terminal and color gamut data coordinates of the display terminal.

The preliminary matching relationship establishment module 2 establishes the preliminary matching relationship between the image data to be matched and the image data to be output of the display terminal. The color gamut data coordinates are vertex coordinates and coordinates of white points. According to the vertex coordinates and coordinates of white points of the source terminal, and the vertex coordinates and coordinates of white points of the display terminal, the preliminary matching relationship of the matrix conversion between the image data to be matched and the image data to be output of the display terminal is established.

The elements in the matrix $A_S$ are determined by the vertex coordinates and coordinates of white points of the source terminal, and the elements in the matrix $A_d$ are determined by the vertex coordinates and coordinates of white points of the display terminal. The image data to be matched is input, and is converted into X, Y and Z tristimulus values through the matrix $A_S$. The X, Y and Z tristimulus values are converted into the image data to be output through the matrix $A_d$. Then, the conversion matrix A between the image data to be matched and the image data to be output of the display terminal is $A = A_S * A_d$, that is, the image data to be matched*A=the image data to be output of the display terminal.

a preliminary matching module 3 for obtaining preliminary image data to be output of the display terminal according to the preliminary matching relationship.

Through the established preliminary matching relationship, the input image data to be matched is converted into preliminary image data to be output through matrix A. When realizing the color gamut conversion in the preliminary matching matrix, only the color coordinates of the three vertices (255, 0, 0), (0, 255, 0) and (0, 0, 255) of the display were considered, and a rough matching was made. It is necessary to further accurately match the preliminary image data to be output obtained in the matrix conversion.

an exact matching module 4 for accurately matching the preliminary image data to be output of the display terminal according to a 3D look-up table to obtain accurate image data to be displayed of the display terminal.

3D look-up table is a technical means of color calibration, and is the calibration of the transmission color gamut to the display color gamut. 3D look-up table has better results. Since the 3D lookup table has R, G and B channels for each coordinate direction, the biggest advantage of the 3D lookup table in the color calibration field can affect the color gamut, color temperature and gamma at the same time, and is more accurate than the traditional matrix calibration method. In addition, the 3D lookup table can match and process all color information whether they are present or not, or those color gamuts that even film can't reach.

The working principle of the 3D lookup table is as follows. Assuming that $R_d$, $G_d$ and $B_d$ data are input, $R_d$, $G_d$ and $B_d$ becomes $R_p$, $G_p$ and $B_p$ which are still RGB data after transformed by the 3D lookup table. The values of $R_p$, $G_p$ and $B_p$ are slightly different from the input data. The effects of $R_p$, $G_p$ and $B_p$ after transformation on the display terminal are the most correct. This is the function of the 3D lookup table, which is equivalent to calibrating the deviation of the display terminal.

In the 3D look-up table, an image data of the input source terminal corresponds to the image data to be displayed of a display terminal of a display color gamut. Different from preliminary matching, the X, Y and Z tristimulus values of the image data of the input source terminal are equal or matched with the X, Y and Z tristimulus values of the image data to be displayed of the output display terminal. The preliminary image data to be output of the input display terminal can be output through the 3D look-up table to output the precise image data to be displayed of the display terminal, so that the transmission color gamut to the display color gamut is transmitted without distortion, and the color display of the source terminal is restored.

Figure 8:
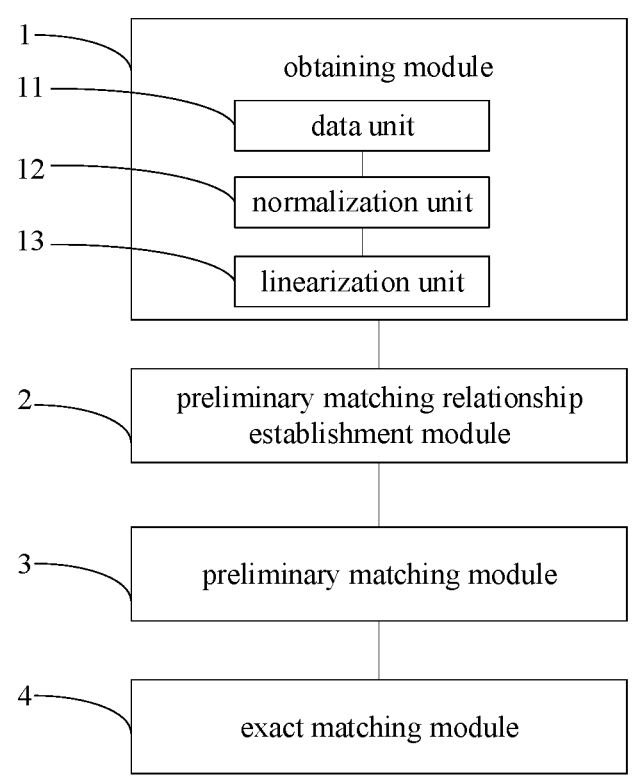
FIG. 8 is a schematic diagram of the color gamut matching device according to a second embodiment of the present disclosure.

Further, as shown in FIG. 8, FIG. 8 is a schematic diagram of the color gamut matching device according to a second embodiment of the present disclosure. The obtaining module includes:

a data unit 11 for obtaining the image data of the source terminal.

The image data of the source terminal is obtained, and the image data of the source terminal is the color gamut pixel value.

a normalization unit 12 for normalizing the image data according to maximum value to obtain normalized image data.

The normalization unit 12 normalizes the image data according to the maximum value, and transforms it into the normalized image data, so that the image data can be linearly processed in the next step.

a linearization unit 13 for linearizing the normalized image data to obtain the image data to be matched.

The linearization unit 13 performs linearization processing to transform the normalized image data into image data to be matched. The normalized image data is linearized, and is converted into linear image data to be matched to meet the data requirements of preliminary matching and exact matching of the color gamut.

Figure 9:
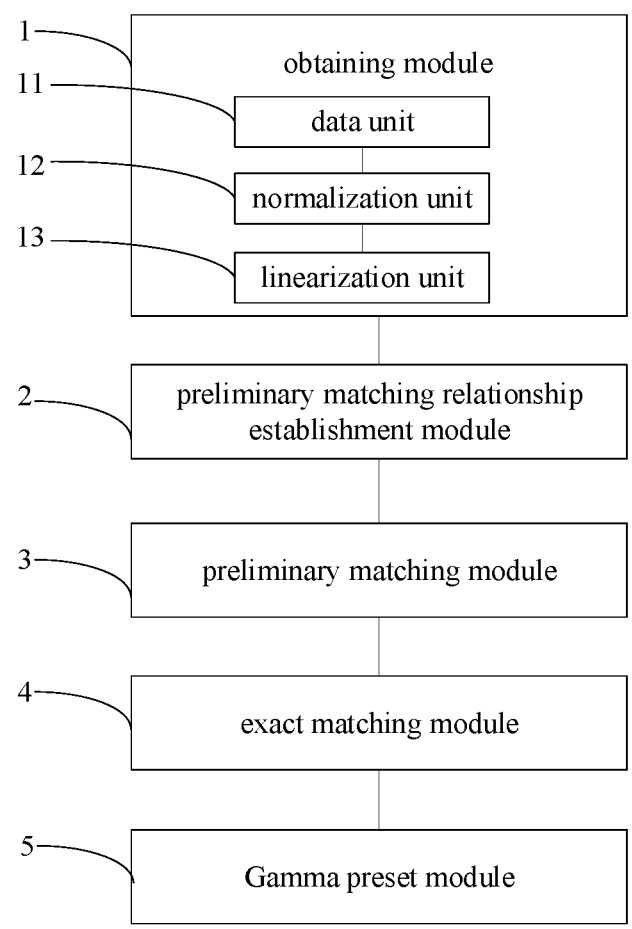
FIG. 9 is a schematic diagram of the color gamut matching device according to a third embodiment of the present disclosure.

Further, as shown in FIG. 9, FIG. 9 is a schematic diagram of the color gamut matching device according to a third embodiment of the present disclosure.

The color gamut matching device further includes:

a Gamma preset module for performing Gamma preset adjustment on the accurate image data to be displayed of the display terminal for display on the display terminal.

The Gamma preset module performs Gamma preset adjustment on the accurate image data to be displayed of the display terminal for display on the display terminal. In order to match the gamma characteristics of the display terminal, the accurate image data to be displayed of the display terminal after matching with the 3D look-up table needs to be gamma preset to offset the influence of the gamma characteristic of the display terminal on the image. The accurate image data to be displayed of the display terminal through the gamma preset adjustment can be output for display on the display terminal.

The present disclosure further provides a display terminal.

The display terminal of the present disclosure includes a memory, a processor, and a color gamut matching program stored on the memory and executable on the processor, the color gamut matching program, when executed by the processor, implements the operations of the color gamut matching method as described above.

The method implemented when the color gamut matching program running on the processor is executed refers to the various embodiments of the color gamut matching method of the present disclosure, which will not be repeated here.

The display terminal includes a television or a computer.

The present disclosure further provides a readable storage medium.

A color gamut matching program is stored on the readable storage medium, and the color gamut matching program, when executed by a processor, implements the operations of the color gamut matching method as described above.

The method implemented when the color gamut matching program running on the processor is executed refers to the various embodiments of the color gamut matching method of the present disclosure, which will not be repeated here.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present disclosure are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present disclosure can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present disclosure.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A color gamut matching method, comprising the following operations:

obtaining image data to be matched of a source terminal;

establishing a preliminary matching relationship between the image data to be matched and image data to be output of a display terminal according to color gamut data coordinates of the source terminal and color gamut data coordinates of the display terminal;

obtaining preliminary image data to be output of the display terminal according to the preliminary matching relationship; and accurately matching the preliminary image data to be output of the display terminal according to a 3D look-up table to obtain accurate image data to be displayed of the display terminal;

wherein the operation of establishing a preliminary matching relationship between the image data to be matched and image data to be output of a display terminal according to color gamut data coordinates of the source terminal and color gamut data coordinates of the display terminal comprises:

matching and converting the image data to be matched to obtain X, Y and Z tristimulus values according to the color gamut data coordinates of the source terminal;

matching and converting the X, Y and Z tristimulus values to obtain the image data to be output of the display terminal according to the color gamut data coordinates of the display terminal; and preliminarily matching the image data to be matched to obtain the image data to be output of the display terminal according to the color gamut data coordinates of the source terminal and the color gamut data coordinates of the display terminal.

2. The color gamut matching method of claim 1, wherein after the operation of accurately matching the preliminary image data to be output of the display terminal according to a 3D look-up table to obtain accurate image data to be displayed of the display terminal, the color gamut matching method further comprises:

performing Gamma preset adjustment on the accurate image data to be displayed of the display terminal for display on the display terminal.

3. The color gamut matching method of claim 1, wherein the operation of obtaining image data to be matched of a source terminal comprises:

obtaining the image data of the source terminal;
normalizing the image data according to maximum value to obtain normalized image data; and
linearizing the normalized image data to obtain the image data to be matched.

4. The color gamut matching method of claim 3, wherein the image data are non-linear R, G and B image signal pixel values, the non-linear R, G and B image signal pixel values range from 0 to $(2^n-1)$, n is number of bits, and the image data to be matched are R, G and B image signal pixel values processed by normalization and linearization.

5. The color gamut matching method of claim 4, wherein the color gamut data coordinates of the source terminal comprise color coordinates of R, G and B vertices and coordinates of white points of the source terminal, and the color gamut data of the display terminal comprise color coordinates of R, G and B vertices and coordinates of white points of the display terminal.

6. The color gamut matching method of claim 5, wherein the operation of establishing a preliminary matching relationship between the image data to be matched and image data to be output of a display terminal according to color gamut data coordinates of the source terminal and color gamut data coordinates of the display terminal comprises:

wherein the matching and converting the image data to be matched to obtain X, Y and Z tristimulus values according to the color gamut data coordinates of the source terminal comprises:

matching and converting the image data to be matched through a matrix $A_S$ to obtain the X, Y and Z tristimulus values, a matching relationship between the matrix $A_S$, image data $R_S$, $G_S$ and $B_S$ to be matched and the X, Y and Z tristimulus values is as follows:

$$\begin{pmatrix} X \\ Y \\ Z \end{pmatrix} = A_S * \begin{pmatrix} R_s \\ G_s \\ B_s \end{pmatrix} \quad (1)$$

elements in the matrix $A_S$ are determined by the color coordinates of R, G and B vertices and the coordinates of white points of the source terminal;

wherein the matching and converting the X, Y and Z tristimulus values to obtain the image data to be output of the display terminal according to the color gamut data coordinates of the display terminal comprises:

matching and converting the X, Y and Z tristimulus values through a matrix $A_d$ to obtain the image data to be output of the display terminal, a matching relationship between the matrix $A_d$, the X, Y and Z tristimulus values and image data $R_d$, $G_d$ and $B_d$ to be output of the display terminal is as follows:

$$\begin{pmatrix} R_d \\ G_d \\ B_d \end{pmatrix} = A_d * \begin{pmatrix} X \\ Y \\ Z \end{pmatrix} \quad (2)$$

elements in the matrix $A_d$ are determined by the color coordinates of R, G and B vertices and the coordinates of white points of the display terminal;

wherein the preliminarily matching the image data to be matched to obtain the image data to be output of the display terminal according to the color gamut data coordinates of the source terminal and the color gamut data coordinates of the display terminal comprises:

preliminarily matching the image data to be matched through a matrix A to obtain the image data to be output of the display terminal, a matching relationship between the matrix A, the image data $R_s$, $G_s$ and $B_s$ to be matched and the image data $R_d$, $G_d$ and $B_d$ to be output of the display terminal is as follows:

$$\begin{pmatrix} R_d \\ G_d \\ B_d \end{pmatrix} = A * \begin{pmatrix} R_s \\ G_s \\ B_s \end{pmatrix} \quad (3)$$

elements in the matrix A are determined by the matrix $A_S$ and the matrix $A_d$, and a conversion relationship between the elements in the matrix A and the matrix $A_S$ and the matrix $A_d$ is as follows:

$$A = A_S * A_d \quad (4).$$

7. A display terminal, comprising a display, a memory, a processor, and a color gamut matching program stored on the memory and executable on the processor, the color gamut matching program, when executed by the processor, implements the following operations:

obtaining image data to be matched of a source terminal;
establishing a preliminary matching relationship between the image data to be matched and image data to be output of the display terminal according to color gamut data coordinates of the source terminal and color gamut data coordinates of the display terminal;
obtaining preliminary image data to be output of the display terminal according to the preliminary matching relationship; and
accurately matching the preliminary image data to be output of the display terminal according to a 3D look-up table to obtain accurate image data to be displayed of the display terminal;
wherein the operation of establishing a preliminary matching relationship between the image data to be matched and image data to be output of a display terminal according to color gamut data coordinates of the source terminal and color gamut data coordinates of the display terminal comprises:

matching and converting the image data to be matched to obtain X, Y and Z tristimulus values according to the color gamut data coordinates of the source terminal;

matching and converting the X, Y and Z tristimulus values to obtain the image data to be output of the display terminal according to the color gamut data coordinates of the display terminal; and preliminarily matching the image data to be matched to obtain the image data to be output of the display terminal according to the color gamut data coordinates of the source terminal and the color gamut data coordinates of the display terminal.

8. The display terminal of claim 7, wherein the color gamut matching program, when executed by the processor, further implements the following operations:

performing Gamma preset adjustment on the accurate image data to be displayed of the display terminal for display on the display terminal.

9. The display terminal of claim 7, wherein the color gamut matching program, when executed by the processor, further implements the following operations:

obtaining the image data of the source terminal;

normalizing the image data according to maximum value to obtain normalized image data; and linearizing the normalized image data to obtain the image data to be matched.

10. A readable storage medium, wherein a color gamut matching program is stored on the readable storage medium, and the color gamut matching program, when executed by a processor, implements the following operations:

obtaining image data to be matched of a source terminal;

establishing a preliminary matching relationship between the image data to be matched and image data to be output of a display terminal according to color gamut data coordinates of the source terminal and color gamut data coordinates of the display terminal;

obtaining preliminary image data to be output of the display terminal according to the preliminary matching relationship; and accurately matching the preliminary image data to be output of the display terminal according to a 3D look-up table to obtain accurate image data to be displayed of the display terminal;

wherein the operation of establishing a preliminary matching relationship between the image data to be matched and image data to be output of a display terminal according to color gamut data coordinates of the source terminal and color gamut data coordinates of the display terminal comprises:

matching and converting the image data to be matched to obtain X, Y and Z tristimulus values according to the color gamut data coordinates of the source terminal;

matching and converting the X, Y and Z tristimulus values to obtain the image data to be output of the display terminal according to the color gamut data coordinates of the display terminal; and preliminarily matching the image data to be matched to obtain the image data to be output of the display terminal according to the color gamut data coordinates of the source terminal and the color gamut data coordinates of the display terminal.

11. The readable storage medium of claim 10, wherein the color gamut matching program, when executed by the processor, further implements the following operations:

performing Gamma preset adjustment on the accurate image data to be displayed of the display terminal for display on the display terminal.

12. The readable storage medium of claim 10, wherein the color gamut matching program, when executed by the processor, further implements the following operations:

obtaining the image data of the source terminal;

normalizing the image data according to maximum value to obtain normalized image data; and linearizing the normalized image data to obtain the image data to be matched.

13. The display terminal of claim 7, wherein the image data are non-linear R, G and B image signal pixel values, the non-linear R, G and B image signal pixel values range from 0 to $(2^n-1)$, n is number of bits, and the image data to be matched are R, G and B image signal pixel values processed by normalization and linearization.

14. The display terminal of claim 7, wherein the color gamut data coordinates of the source terminal comprise color coordinates of R, G and B vertices and coordinates of white points of the source terminal, and the color gamut data of the display terminal comprise color coordinates of R, G and B vertices and coordinates of white points of the display terminal.

15. The display terminal of claim 14, wherein the matching and converting the image data to be matched to obtain X, Y and Z tristimulus values according to the color gamut data coordinates of the source terminal comprises:

matching and converting the image data to be matched through a matrix $A_S$ to obtain the X, Y and Z tristimulus values, a matching relationship between the matrix $A_S$, image data $R_S$, $G_S$ and $B_S$ to be matched and the X, Y and Z tristimulus values is as follows:

$$\begin{pmatrix} X \\ Y \\ Z \end{pmatrix} = A_S * \begin{pmatrix} R_s \\ G_s \\ B_s \end{pmatrix} \quad (1)$$

elements in the matrix $A_S$ are determined by the color coordinates of R, G and B vertices and the coordinates of white points of the source terminal;

wherein the matching and converting the X, Y and Z tristimulus values to obtain the image data to be output of the display terminal according to the color gamut data coordinates of the display terminal comprises:

matching and converting the X, Y and Z tristimulus values through a matrix $A_d$ to obtain the image data to be output of the display terminal, a matching relationship between the matrix $A_d$, the X, Y and Z tristimulus values and image data $R_d$, $G_d$ and $B_d$ to be output of the display terminal is as follows:

$$\begin{pmatrix} R_d \\ G_d \\ B_d \end{pmatrix} = A_d * \begin{pmatrix} X \\ Y \\ Z \end{pmatrix} \quad (2)$$

elements in the matrix $A_d$ are determined by the color coordinates of R, G and B vertices and the coordinates of white points of the display terminal;

wherein the preliminarily matching the image data to be matched to obtain the image data to be output of the display terminal according to the color gamut data coordinates of the source terminal and the color gamut data coordinates of the display terminal comprises:

preliminarily matching the image data to be matched through a matrix A to obtain the image data to be output of the display terminal, a matching relationship between the matrix A, the image data $R_s$, $G_s$ and $B_s$ to be matched and the image data $R_d$, $G_d$ and $B_d$ to be output of the display terminal is as follows:

$$\begin{pmatrix} R_d \\ G_d \\ B_d \end{pmatrix} = A * \begin{pmatrix} R_s \\ G_s \\ B_s \end{pmatrix} \quad (3)$$

elements in the matrix A are determined by the matrix $A_S$ and the matrix $A_d$, and a conversion relationship between the elements in the matrix A and the matrix $A_S$ and the matrix $A_d$ is as follows:

$$A = A_S * A_d \quad (4).$$

16. The readable storage medium of claim 10, wherein the image data are non-linear R, G and B image signal pixel values, the non-linear R, G and B image signal pixel values range from 0 to $(2^n-1)$, n is number of bits, and the image data to be matched are R, G and B image signal pixel values processed by normalization and linearization.

17. The readable storage medium of claim 10, wherein the matching and converting the image data to be matched to obtain X, Y and Z tristimulus values according to the color gamut data coordinates of the source terminal comprises:

matching and converting the image data to be matched through a matrix $A_S$ to obtain the X, Y and Z tristimulus values, a matching relationship between the matrix $A_S$, image data $R_S$, $G_S$ and $B_S$ to be matched and the X, Y and Z tristimulus values is as follows:

$$\begin{pmatrix} X \\ Y \\ Z \end{pmatrix} = A_S * \begin{pmatrix} R_s \\ G_s \\ B_s \end{pmatrix} \quad (1)$$

elements in the matrix $A_S$ are determined by the color coordinates of R, G and B vertices and the coordinates of white points of the source terminal;

wherein the matching and converting the X, Y and Z tristimulus values to obtain the image data to be output of the display terminal according to the color gamut data coordinates of the display terminal comprises:

matching and converting the X, Y and Z tristimulus values through a matrix $A_d$ to obtain the image data to be output of the display terminal, a matching relationship between the matrix $A_d$, the X, Y and Z tristimulus values and image data $R_d$, $G_d$ and $B_d$ to be output of the display terminal is as follows:

$$\begin{pmatrix} R_d \\ G_d \\ B_d \end{pmatrix} = A_d * \begin{pmatrix} X \\ Y \\ Z \end{pmatrix} \quad (2)$$

elements in the matrix $A_d$ are determined by the color coordinates of R, G and B vertices and the coordinates of white points of the display terminal;

wherein the preliminarily matching the image data to be matched to obtain the image data to be output of the display terminal according to the color gamut data coordinates of the source terminal and the color gamut data coordinates of the display terminal comprises:

preliminarily matching the image data to be matched through a matrix A to obtain the image data to be output of the display terminal, a matching relationship between the matrix A, the image data $R_s$, $G_s$ and $B_s$ to be matched and the image data $R_d$, $G_d$ and $B_d$ to be output of the display terminal is as follows:

$$\begin{pmatrix} R_d \\ G_d \\ B_d \end{pmatrix} = A * \begin{pmatrix} R_s \\ G_s \\ B_s \end{pmatrix} \quad (3)$$

elements in the matrix $A_d$ are determined by the matrix $A_S$ and the matrix $A_d$, and a conversion relationship between the elements in the matrix A and the matrix $A_S$ and the matrix $A_d$ is as follows:

$$A = A_S * A_d \quad (4).$$

* * * * *